Patented Jan. 29, 1952

2,584,036

UNITED STATES PATENT OFFICE 2,584,036

AZEOTROPIC DEHYDRATION OF AQUEOUS CHLORAL MIXTURES

John F. Mahoney, Linden, N. J., and Earl Pierson, Harrisonburg, Va., assignors to Merck & Co., Inc., Rahway, N. J., a corporation of New Jersey No Drawing. Application April 13, 1946, Serial No. 662,103

10 Claims. (Cl. 202—42)

This invention relates to the recovery of chloral in anhydrous form from mixtures in which the chloral is present along with water and other components. It is also particularly concerned with a process which permits the recovery of anhydrous chloral from chloral hydrate.

The recovery of chloral in substantially anhydrous form from aqueous solutions in which this compound is present, or from chloral hydrate, has been the subject of extensive investigation. Sulfuric acid has been used in order to remove the water component of the mixture or to remove water from chloral hydrate with the formation of chloral. While this method has proven practicable in certain instances, the yield of anhydrous chloral is substantially reduced by the high degree of solubility of chloral in the sulfuric acid used to extract the water.

Where high temperatures are employed in the dehydration process, using sulfuric acid as the dehydrating agent, the yield of chloral has similarly been reduced owing to partial decomposition of the chloral at the elevated temperatures.

We have now found that it is possible to recover substantially anyhdrous chloral from mixtures in which chloral is present along with greater or less amounts of water, or to recover substantially anyhdrous chloral from chloral hydrate by a simple azeotropic distillation process in which the water is removed as a component of a low boiling azeotropic mixture. Our method is applicable both in the treatment of mixtures consisting essentially of chloral and water, or chloral hydrate, or for the treatment of mixtures, such as might be secured by the chlorination of ethanol, in which other low boiling and higher boiling components are present.

It is the primary object of our invention to render available an improved process for the recovery of substantially anhydrous chloral from chloral hydrate, or from mixtures containing chloral in association with greater or less amounts of water employing the principles of azeotropic distillation.

It is another object of our invention to provide a method for recovering substantially anhydrous chloral which is efficient and inexpensive in operation, and which permits ready recovery of the anhydrous chloral by means of a simple distilling operation.

It is another object of our invention to provide a method for the recovery of substantially anhydrous chloral in which losses of chloral due to high temperature operations, or due to solution in, or reaction with, the active agent utilized to remove water, are avoided. This and still other objects of our invention will be apparent from the ensuing disclosure of certain preferred embodiments of our method for the recovery of substantially anhydrous chloral.

A customary method used industrially in the preparation of chloral involves the chlorination of ethanol. The product resulting from this chlorination contains, in addition to chloral, water, low boiling volatile materials such as hydrogen chloride, unreacted alcohol and high boiling materials such as chloral alcoholate. The recovery of substantially anhydrous chloral from such reaction mixtures in substantially quantitative yields has always been a difficult operation.

We have found that, insofar as our improved recovery procedure is concerned, it makes no difference whether the chloral is present in the aqueous mixture treated in the forr of chloral or chloral hydrate, since the latter c mpound is substantially converted to chloral an l water at the boiling point. In the ensuing description and claims it is our intention to include chloral hydrate within the scope of the term "mixture containing chloral and water," since chloral hydrate behaves exactly as a mixture of chloral and water when treated in accordance with our recovery process for the obtainment of substantially anhydrous chloral.

In carrying out our improved recovery process we add to the mixture containing chloral and water, or add to the chloral hydrate alone, a liquid which forms with the aqueous component of the mixture a constant boiling mixture. This constant boiling mixture must boil at a temperature below the boiling point of either the entraining liquid added or of the substantially anhydrous chloral. Since substantially anhydrous chloral boils at a temperature of 97° C., it is obvious that a wide variety of entraining liquids may be added for this purpose. Among liquids which form constant boiling or azeotropic mixtures with the water, these azeotropic mixtures boiling below the boiling point of the added liquid and below the boiling point of anhydrous chloral, we have found that benzene n-hexane and solvent mixtures such as hydrocarbon fractions are suitable. Benzene, boiling at 80.1° C., forms a constant boiling mixture with water. This constant boiling mixture boils at a temperature of 69–70° C. n-Hexane which has a boiling point of 69° C., similarly forms an azeotropic or constant boiling mixture with water which boils at a temperature of 63° C. All these temperatures are of course, below the boiling point of anhydrous chloral which distills at 97.6° C.

In accordance with a preferred embodiment of our invention, we add to the chloral hydrate, or to the liquid containing chloral admixed with water and perhaps various other components, an entraining liquid selected, as above described, to form a low boiling azeotropic mixture with the aqueous component of the system. This may be benzene, n-hexane, or any other suitable entraining liquid. The mixture is then subjected to distillation in a fractionation column provided with reflux. If the chloral containing liquid treated, contains any known gases, or lowboiling volatile material, these materials are removed first. The next portion of the mixture to distill over is the azeotropic mixture of water and entraining liquid, this mixture having a boiling point below the boiling point of the entraining liquid and below the boiling point of the chloral. The next component to distill is the excess entraining liquid, which liquid, as in the case of benzene and n-hexane, boils below the boiling point of the chloral. A substantially anhydrous chloral is then distilled at a temperature of about 97.6° C. and may be suitably collected and condensed. Higher boiling materials, if any be present in the mixture treated, will remain behind in the still. If the column is an efficient one, these higher boiling materials may of course be separated into various components. The azeotropic mixture of entraining liquid and water distilled may be condensed, the entraining liquid separated therefrom and this entraining liquid returned to the still for further treatment. In this way the amount of entraining liquid added to effect the separation may be reduced, since it may be used over and over again to remove successive portions of water from the mixture containing the chloral and water, or from the chloral hydrate if this is the product treated.

The way in which our invention may be applied in the treatment of various mixtures obtained industrially in the manufacture of chloral, and how it may be applied to recovering substantially anhydrous chloral from chloral hydrate, will be apparent from the ensuing illustrative examples. These examples are, of course, to be regarded primarily as illustrating our invention and as not limiting the invention to any precise conditions or a mode of operation or to the treatment of any particular chloral or chloral hydrate containing starting material.

Example 1

Chloral hydrate was treated in accordance with our improved process to recover substantially anhydrous chloral therefrom. Since chloral hydrate is decomposed during the distillation into chloral and water, the treatment of chloral hydrate is merely one illustration of the treatment of a mixture in which the chloral is present along with an aqueous component.

In recovering the substantially anhydrous chloral we used a jacketed fractionation column of 18 mm. inside diameter. This column was packed to a height of 85 cm. with glass helices of 0.125 inch diameter. The column was provided with a specially constructed reflux control and decanting distillation head.

Approximately 1000 g. of chloral hydrate were introduced into the still. Benzene was utilized as the entraining liquid and 300 g. were added to the chloral hydrate. Upon distillation an azeotropic mixture of water and benzene was distilled over at a temperature of 69–70° C. The mixture of water and benzene, after condensation, was allowed to separate into two layers and the benzene returned to the still. This was done several times until substantially pure benzene began to distill over at a temperature of 80–81° C. After all the benzene had been distilled out, substantially anhydrous chloral was distilled over at a temperature of about 97° C. and collected in a condensing vessel. This material was substantially anhydrous in character and contained no residual benzene.

Example 2

In this example our process was applied in the recovery of substantially anhydrous chloral from a chlorinated oil prepared by following the standard procedure for the manufacture of chloral as described in Thorpe, Dictionary of Applied Chemistry, 3rd ed., vol. 2, page 178. This chlorinated oil contained, approximately, 75.2% of chloral; 18.1% of water; and 6.7% of volatile gases such as hydrogen chloride as well as higher boiling material such as chloral alcoholate.

1000 g. of chlorinated oil were introduced into the distillation apparatus fitted with column, reflux control and decanting distilling head described in Example 1. 300 gm. of benzene as the entraining liquid were added thereto, and distillation begun. The low boiling non-condensible gas was driven off first. At 72° C. the azeotropic mixture of water and benzene distilled over. This was condensed, allowed to separate into two layers, and the benzene layer removed and returned to the still. After several reintroductions of the benzene component in this way, the material coming over distilled at about 79° C. and was substantially pure benzene. After all the benzene had been distilled out, substantially anhydrous chloral distilled over at a temperature of 96–97° C. and was collected in a condensing vessel. This material was found to be substantially free from both benzene and water.

As distillation continued, a high boiling fraction, boiling at about 110° C. was distilled over. Upon condensation this proved to be an oily liquid containing small amounts of crystalline material. When this crystalline material was removed by filtration, and recrystallized from a suitable solvent, it was found to be chloral alcoholate having a melting point of about 49–50° C.

Example 3

To 1000 gms. of a chloral-containing material prepared by the chlorination of ethanol there were added 150 gms. of n-hexane. The chlorinated ethanol contained approximately 75.2% of chloral; 18.1% of water; and 6.7% of volatile gases such as hydrogen chloride, and high boiling materials such as chloral alcoholate. The mixture was introduced into the still as described in Example 1 and refluxing begun. The low boiling non-condensible gases were driven off first. An azeotropic mixture of water and n-hexane boiling at 63° C., was next distilled. This mixture was condensed, allowed to separate into two layers, and the n-hexane layer returned to the still. This was done a sufficient number of times to insure removal of all the water in the form of the constant boiling azeotropic n-hexane-water mixture. When all the water was removed a rise in temperature occurred and the n-hexane was distilled over at a temperature of about 69° C.

The next fraction to distill over was substantially anhydrous chloral, boiling at a temperature of about 98° C. This product was substantially free from both benzene and water.

Finally the high boiling material boiling at a temperature of 110° C. and containing some chloral alcoholate distilled over.

Various changes and modifications may be made in our process of recovering substantially anhydrous chloral, as described, which would nevertheless be within the scope of our invention.

We claim:

1. The method of recovering chloral from a mixture in which water is present along with said chloral which comprises: adding to said mixture an entraining liquid selected from the group consisting of benzene and n-hexane which forms with said water a substantially constant boiling mixture of said entraining liquid and water, said substantially constant boiling mixture boiling below the boiling points of both said entraining liquid and said chloral; distilling the resulting mixture to separate off therefrom said constant boiling mixture of entraining liquid and water, thereby removing water from said chloral; distilling off said entraining liquid from the remaining liquid mixture; and recovering said chloral in substantially water-free form therefrom.

2. The method of recovering chloral from a mixture in which water is present along with said chloral which comprises: adding benzene to said mixture, said benzene forming with said water a substantially constant boiling mixture of benzene and water; boiling off from the resulting mixture said substantially constant boiling mixture of benzene and water, thereby removing water from said chloral; distilling benzene off from the liquid mixture which remains; and recovering said chloral in substantially water-free form therefrom.

3. The method of recovering chloral from a mixture in which water is present along with said chloral which comprises: adding n-hexane to said mixture, said n-hexane forming with said water a substantially constant boiling mixture of n-hexane and water; boiling off from the resulting mixture said substantially constant boiling mixture of n-hexane and water, thereby removing water from said chloral; distilling n-hexane off from the liquid mixture which remains; and recovering said chloral in substantially water-free form therefrom.

4. The method of recovering chloral from chloral hydrate which comprises: adding to chloral hydrate an entraining liquid selected from the group consisting of benzene and n-hexane which forms with the water present in chloral hydrate a substantially constant boiling mixture of said entraining liquid and water, said substantially constant boiling mixture boiling below the boiling points of said entraining liquid and said chloral; distilling the resulting mixture to separate off therefrom said constant boiling mixture of entraining liquid and water, thereby removing water from said chloral hydrate; distilling off said entraining liquid from the remaining liquid mixture; and recovering said chloral in substantially water-free form therefrom.

5. The method of recovering chloral from a chloral hydrate which comprises: adding benzene to chloral hydrate, said benzene forming with water present in chloral hydrate a substantially constant boiling mixture of benzene and water; boiling off from the resulting mixture said substantially constant boiling mixture of benzene and water, thereby removing water from said chloral; distilling benzene off from the liquid mixture which remains; and recovering said chloral in substantially water-free form therefrom.

6. The method of recovering chloral from chloral hydrate which comprises: adding n-hexane to chloral hydrate, said n-hexane forming with the water present in chloral hydrate a substantially constant boiling mixture of n-hexane and water; boiling off from the resulting mixture said substantially constant boiling mixture of n-hexane and water, thereby removing water from said chloral hydrate; distilling n-hexane off from the liquid mixture which remains; and recovering said chloral in substantially water-free form therefrom.

7. The method of recovering chloral from a mixture of approximately 75% chloral, 18% water and 7% volatile gases and high boiling fractions which comprises: adding to said mixture an entraining liquid selected from the group consisting of benzene and n-hexane which forms with said water a substantially constant boiling mixture of said entraining liquid and water, said substantially constant boiling mixture boiling below the boiling points of both said entraining liquid and said chloral; heating the resulting mixture to separate off therefrom any volatile gases; distilling the resulting mixture to separate off therefrom said constant boiling mixture of entraining liquid and water thereby removing water from said chloral; distilling off said entraining liquid from the remaining liquid mixture and recovering said chloral in substantially water-free form thereform.

8. The method of recovering chloral from a mixture of approximately 75% chloral, 18% water and 7% volatile gases and high boiling fractions which comprises: adding benzene to said mixture, said benzene forming with said water a substantially constant boiling mixture of benzene and water; heating the resulting mixture to separate off therefrom any volatile gases; boiling off from the resulting mixture said substantially constant boiling mixture of benzene and water, thereby removing water from said chloral; distilling benzene off from the liquid mixture which remains; and recovering said chloral in substantially water-free form therefrom.

9. The method of recovering chloral from a mixture of approximately 75% chloral, 18% water and 7% volatile gases and high boiling fractions which comprises: adding n-hexane to said mixture, said n-hexane forming with said water a substantially constant boiling mixture of n-hexane and water; heating said mixture to separate off therefrom any volatile gases; boiling off from the resulting mixture said substantially constant boiling mixture of n-hexane and water, thereby removing water from said chloral; distilling n-hexane off from the liquid mixture which remains, and recovering said chloral in substantially water-free form therefrom.

10. In a process for the recovery of chloral from its aqueous solutions the steps comprising adding benzene, distilling an azeotrop of said benzene with water from the chloral, and recovering chloral from the residue.

JOHN F. MAHONEY.
EARL PIERSON.

(References on following page)

REFERENCES CITED

The following references are of record in the file of this patent:

UNITED STATES PATENTS

| Number | Name | Date |
|---|---|---|
| 1,290,124 | Downs | Jan. 7, 1919 |
| 1,386,118 | Kirst | Aug. 2, 1921 |
| 2,050,235 | Othmer | Aug. 4, 1936 |
| 2,144,654 | Guthman et al. | Jan. 24, 1939 |
| 2,194,851 | Guinot | Mar. 26, 1940 |
| 2,406,648 | Weisberg | Aug. 27, 1946 |
| 2,462,444 | Weiss | Feb. 22, 1949 |

OTHER REFERENCES

Guinot et al.: "Azeotropic Distillation in Industry," 16 transactions of the Institution of Chemical Engineers, 189–194 (1938). Copy in Scientific Library.

Othmer: "Partial Pressure Processes," 33 Industrial and Engineering Chemistry, 1106–1112, (September 1941).